United States Patent [19]

Mizuno et al.

[11] Patent Number: 4,979,127
[45] Date of Patent: Dec. 18, 1990

[54] METHOD FOR AUTOMATICALLY SETTING A TOOL TIP POINT

[75] Inventors: Toru Mizuno, Tama; Ryuichi Hara; Hiroji Nishi, both of Yamanashi, all of Japan

[73] Assignee: Fanuc Ltd, Minamitsuru, Japan

[21] Appl. No.: 335,539

[22] PCT Filed: Sep. 2, 1988

[86] PCT No.: PCT/JP88/00885
§ 371 Date: Mar. 27, 1988
§ 102(e) Date: Mar. 27, 1988

[87] PCT Pub. No.: WO89/02349
PCT Pub. Date: Mar. 23, 1989

[30] Foreign Application Priority Data

Sep. 16, 1987 [JP] Japan .................. 62-229820

[51] Int. Cl.$^5$ .......................... G05B 19/415
[52] U.S. Cl. .................. 364/513; 364/167.01; 901/18
[58] Field of Search ........... 364/513, 167.01, 474.28; 901/18, 50; 318/568.13, 568.15

[56] References Cited

U.S. PATENT DOCUMENTS

| | | | |
|---|---|---|---|
| 4,698,777 | 10/1987 | Toyoda et al. | 364/513 |
| 4,815,006 | 3/1989 | Andersson et al. | 364/513 |
| 4,835,710 | 5/1989 | Schnelle et al. | 364/513 |
| 4,853,603 | 8/1989 | Onoue et al. | 318/568.15 |

*Primary Examiner*—Jerry Smith
*Assistant Examiner*—Paul Gordon
*Attorney, Agent, or Firm*—Staas & Halsey

[57] ABSTRACT

An automatic setting method is provided, in which the position of a tool tip point in a coordinate system set for a faceplate of a robot, can be set easily and accurately. The robot is caused to assume different postures while maintaining the tool tip point of a tool (2) at one point (4) within a space in which the robot is installed. Four or more coordinate positions of a faceplate center point (3) corresponding to the individual postures of the robot are given for instruction. Subsequently, a spherical surface (5) passing through these instruction positions is determined by the method of least squares, and the position of the tool tip point in the faceplate coordinate system is calculated and set on the basis of a calculated value of the position of the center of curvature of the spherical surface, the individual instruction coordinate positions, and tool posture vectors.

8 Claims, 4 Drawing Sheets

METHOD FOR AUTOMATICALLY SETTING A TOOL TIP POINT

BACKGROUND OF THE INVENTION

1. Field of the Invention

The present invention relates to a method for automatically setting the point of operation of an end effector, i.e., a tool tip point (TCP), in an industrial robot.

2. Description of the Related Art

In mounting a tool on a tool mounting surface of a wrist portion, i.e., a faceplate, of a robot, the coordinate position of a tool tip point, in a faceplate coordinate system having its origin on the center point of the faceplate, must be set. When using a tool whose tip point position is unknown, therefore, such setting is conventionally effected by determining the coordinate position of the tool tip point on the basis of design drawings of the tool, and manually inputting numerical values indicative of the position into a control device of the robot.

However, the design drawings of the tool are often unavailable. In such a case, the coordinate position of the tool is conventionally set in the aforesaid manner after determining the position from actual measurements of various parts of the tool obtained by means of a measuring instrument. Actually measuring the tool, however, is troublesome and subject to substantial errors.

SUMMARY OF THE INVENTION

Accordingly, the object of the present invention is to provide a method for automatically setting a tool tip point, in which the position of the tool tip point in a faceplate coordinate system of a robot can be set easily and accurately, without requiring design drawings or a tool measurement by means of a measuring instrument.

In order to achieve the above object, a method according to the present invention comprises steps of: (a) causing a robot to assume at least four postures in a state such that the tip point of a tool is located on one point within a space in which the robot is installed, and instructing the robot of coordinate positions of the center point of a faceplate of the robot, in a base coordinate system set in the space, when the robot assumes the individual postures; (b) calculating the position of the center of curvature of a spherical surface passing through or near the individual coordinate positions thus given for instruction, on the basis of the coordinate positions; and (c) determining and setting the coordinate position of the tool tip point, in a faceplate coordinate system set for the faceplate, on the basis of posture vectors of the tool, the position of the center of curvature of the spherical surface thus calculated, and at least one coordinate position of the faceplate center point given for instruction in the step (a).

According to the present invention, as described above, the tool tip point is automatically set by only giving four or more points for instruction while changing the posture of the robot, in a state such that the tool tip point is located on the certain point within the robot installation space, so that the tool tip point can be set easily and with high accuracy, without requiring a manual input operation based on design drawings of the tool or actual measurements of the tool obtained by means of a measuring instrument.

DESCRIPTION OF THE PREFERRED EMBODIMENT

Figure 1:
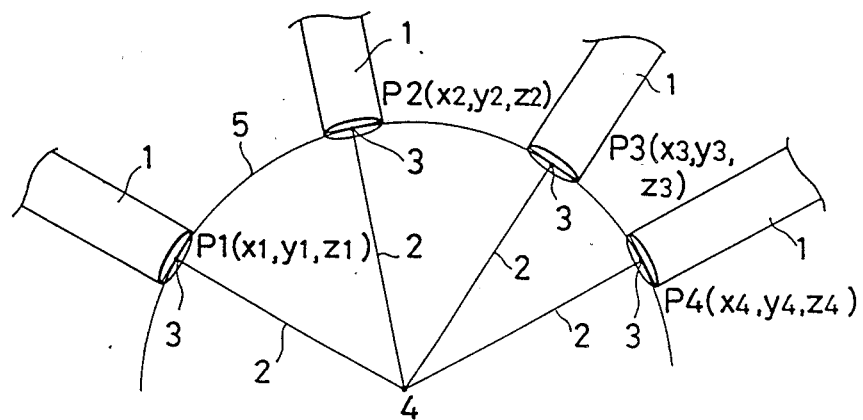
FIG. 1 is a diagram of a tool on a robot arm for illustrating the principle of the present invention.
Figure 2:
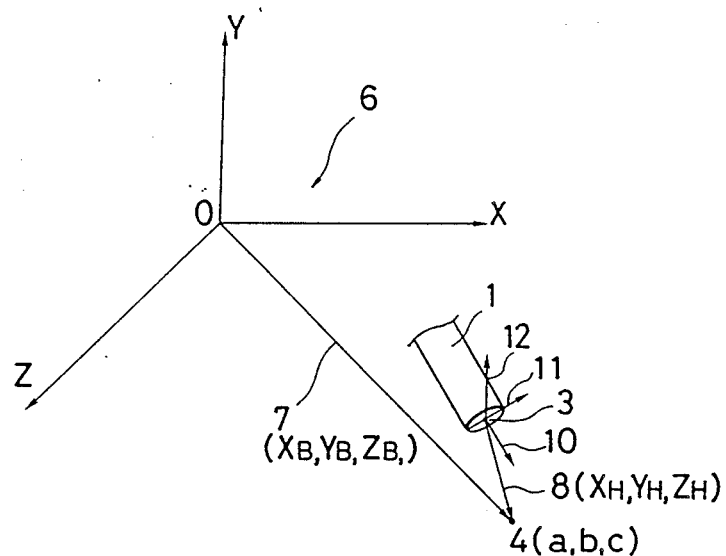
FIG. 2 is a diagram of a robot arm for illustrating the relationship between a base coordinate system and a faceplate coordinate system.

Referring first to FIGS. 1 and 2, the principle of the present invention will be described. In FIG. 1, reference numerals 1, 2 and 3 denote an arm of a robot, a tool attached to a faceplate of the arm 1, and the center point of the faceplate, respectively.

In order to determine the coordinate position of the tip point of tool 2, in a faceplate coordinate system centered on the faceplate 3, the robot is caused to assume four postures in succession, with the tool tip point located on one point 4 in a robot installation space. When the robot assumes each posture, the coordinate position of the faceplate center point 3 in each posture is given in a base coordinate system for the aforesaid space.

Here let it be supposed that a coordinate position P1 of the faceplate center point 3 at the time of a first instruction is given by (x1, y1, z1), a coordinate position P2 of the faceplate center point 3 at the time of a second instruction is given by (x2, y2, z2), and likewise, third and fourth instruction points P3 and P4 are given by (x3, y3, z3) and (x4, y4, z4), respectively. Since the tool tip point of the tool 2 is always situated on the one point 4, these instruction points P1 to P4 are on a spherical surface (hereinafter referred to as a sphere) having its center on the one point 4. Thus, if the coordinate position of the point 4 in the base coordinate system and the radius of the sphere (or tool length) are (a, b, c) and r, respectively, the following equations hold for the aforesaid instruction points P1 to P4.

$$(x1-a)^2+(y1-b)^2+(z1-c)^2=r^2, \quad (1)$$

$$(x2-a)^2+(y2-b)^2+(z2-c)^2=r^2, \quad (2)$$

$$(x3-a)^2+(y3-b)^2+(z3-c)^2=r^2, \quad (3)$$

$$(x4-a)^2+(y4-b)^2+(z4-c)^2=r^2. \quad (4)$$

In the equations (1) to (4), x1 to x4, y1 to y4, and z1 to z4 are known values obtained at the time of the individual instructions, and the unknowns are a, b, c and r. Thus, the center (a, b, c) of curvature of the sphere (hereinafter referred to as the center point of the sphere) and the radius r of the sphere can be obtained by solving the four simultaneous equations (1) to (4).

Figure 3:
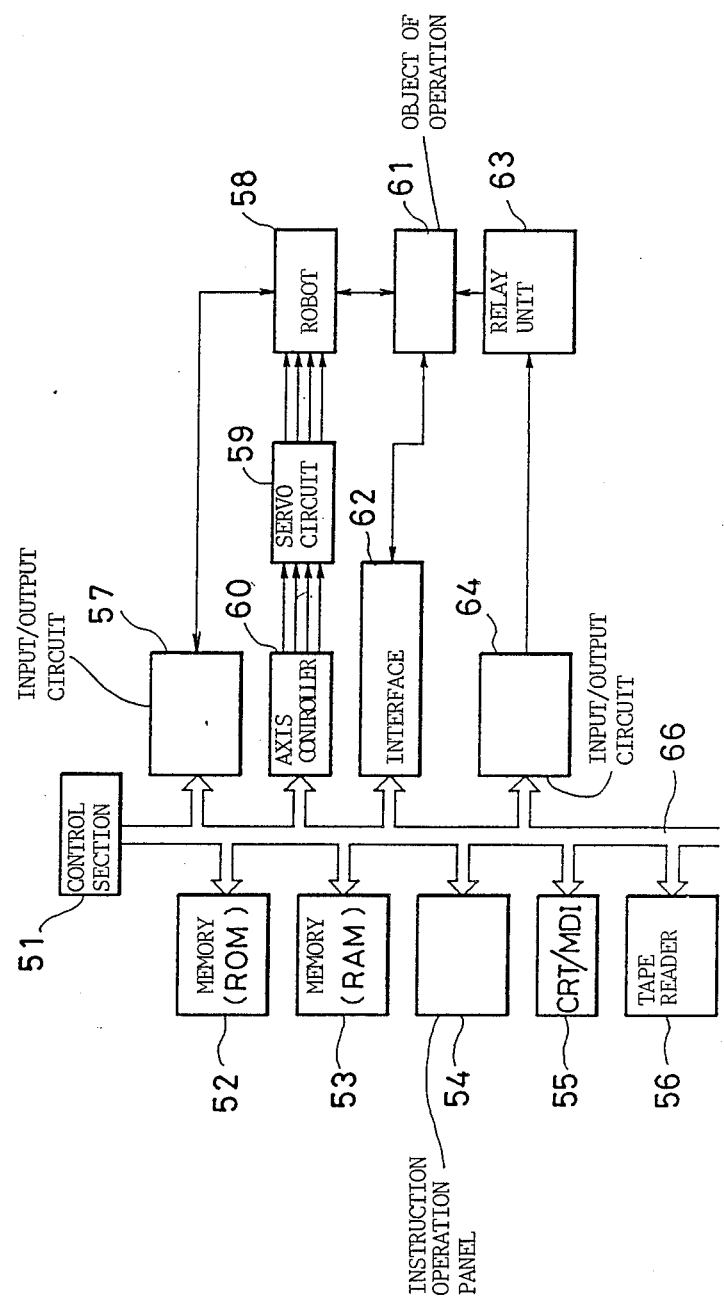
FIG. 3 is a block diagram of a robot to which is applied a method for automatically setting a tool tip point according to one embodiment of the present invention, and the principal part of a control circuit for controlling the robot.

With reference to FIG. 3, let us suppose, that vectors directed from the origin 0 of the base coordinate system 6 to the point 4 and from the center point 3 of the faceplate to the point 4 are designated by numerals 7 8, respectively, numerals 10, 11 and 12 denote tool posture vectors, the components of the vector in the base coordinate system 6 8 and 7 are given by ($X_H$, $Y_H$, $Z_H$) and ($X_B$, $Y_B$, $Z_B$), respectively, the components of the posture vectors 10, 11 and 12 in the base coordinate system 6 are given by ($1_X$, $1_Y$, $1_Z$), ($m_X$, $m_Y$, $m_Z$), and ($n_X$, $n_Y$, $n_Z$), respectively, and the center point 3 of the faceplate is given by ($O_X$, $O_Y$, $O_Z$). Thereupon, the following equation holds.

$$\begin{pmatrix} X_B \\ Y_B \\ Z_B \\ 1 \end{pmatrix} = \begin{pmatrix} l_X & m_X & n_X & O_X \\ l_Y & m_Y & n_Y & O_Y \\ l_Z & m_Z & n_Z & O_Z \\ 0 & 0 & 0 & 1 \end{pmatrix} \begin{pmatrix} X_H \\ Y_H \\ Z_H \\ 1 \end{pmatrix}. \quad (5)$$

From the equation (5), we obtain $$\begin{pmatrix} X_H \\ Y_H \\ Z_H \\ 1 \end{pmatrix} = \begin{pmatrix} l_X & m_X & n_X & O_X \\ l_Y & m_Y & n_Y & O_Y \\ l_Z & m_Z & n_Z & O_Z \\ 0 & 0 & 0 & 1 \end{pmatrix}^{-1} \begin{pmatrix} X_B \\ Y_B \\ Z_B \\ 1 \end{pmatrix}.$$

Since ($X_B$, $Y_B$, $Z_B$) of the vector 7 is the value (a, b, c) obtained by solving the simultaneous equations (1) to (4), the above equation can be rearranged as follows:

$$\begin{pmatrix} X_H \\ Y_H \\ Z_H \\ 1 \end{pmatrix} = \begin{pmatrix} l_X l_Y l_Z & -(l_X O_X + l_Y O_Y + l_Z O_Z) \\ m_X m_Y m_Z & -(m_X O_X + m_Y O_Y + m_Z O_Z) \\ n_X n_Y n_Z & -(n_X O_X + n_Y O_Y + n_Z O_Z) \\ 0 \quad 0 \quad 0 & 1 \end{pmatrix} \begin{pmatrix} a \\ b \\ c \\ 1 \end{pmatrix} \quad (6)$$

In equation (6), the posture vectors 10 ($1_X$, $1_Y$, $1_Z$), 11 ($m_X$, $m_Y$, $m_Z$), and 12 ($n_X$, $n_Y$, $n_Z$) are values obtained from the values of various joint angles of the robot detectable by a conventional method, and the center point ($O_X$, $O_Y$, $O_Z$) of the faceplate is an instruction point. Thus, by substituting these values into the equation (6), the components ($X_H$, $Y_H$, $Z_H$) of the vector 8, that is, the coordinate position ($x_H$, $y_H$, $z_H$) of the tool tip point in the faceplate coordinate system, is obtained, and this position may be set as the tool tip point.

Referring now to FIGS. 3 to 6, a method for automatically setting a tool tip point according to one embodiment of the present invention will be described. FIG. 3 is a block diagram of a robot to which the method of the invention is applied and peripheral elements. The robot is provided with a control section 51 which includes a central processing unit (hereinafter referred to as a CPU). The control section 51 is connected with a memory 52 formed as a ROM, a memory 53 formed as a RAM, an instruction operation panel 54, an operation panel 55 with CRT display, and a tape reader 56.

The memory 52 is stored with various control programs to be executed by means of the control section 51. The memory 53 is stored with instruction data, inputted through the instruction operation panel 54, the operation panel 55, the tape reader 56, etc., data inputted through the operation panel 55, and results and data of calculations executed by the control section 51. The instruction operation panel 54 has a numerical indicator, lamps, and operation buttons, which are necessary for the operation of the robot. The data input device (hereinafter referred to as a CRT/MDI) 55 with CRT display includes various keys, such as ten-key numeric keypad and function keys, as well as a display unit having a CRT. An operator can input various data through the CRT/MDI 55. Numeral 60 denotes an axis controller including an interpolator and adapted for axis control of a plurality of axes, numeral 59 denotes a servo circuit for controlling a drive source of the robot 58, and numeral 64 denotes an input/output circuit, which performs input/output operations for signals delivered to and from an object 61 of operation, through the medium of a relay unit 63. Numeral 57 denotes an input/output circuit through which various detection signals from the robot 58 are applied to the input of the control section 51. Numeral 62 denotes an interface for interfacial connection with the object 61 of operation, and numeral 66 denotes a bus line. Since these devices can be constructed by a conventional method, a detailed description thereof is omitted.

Figure 4:
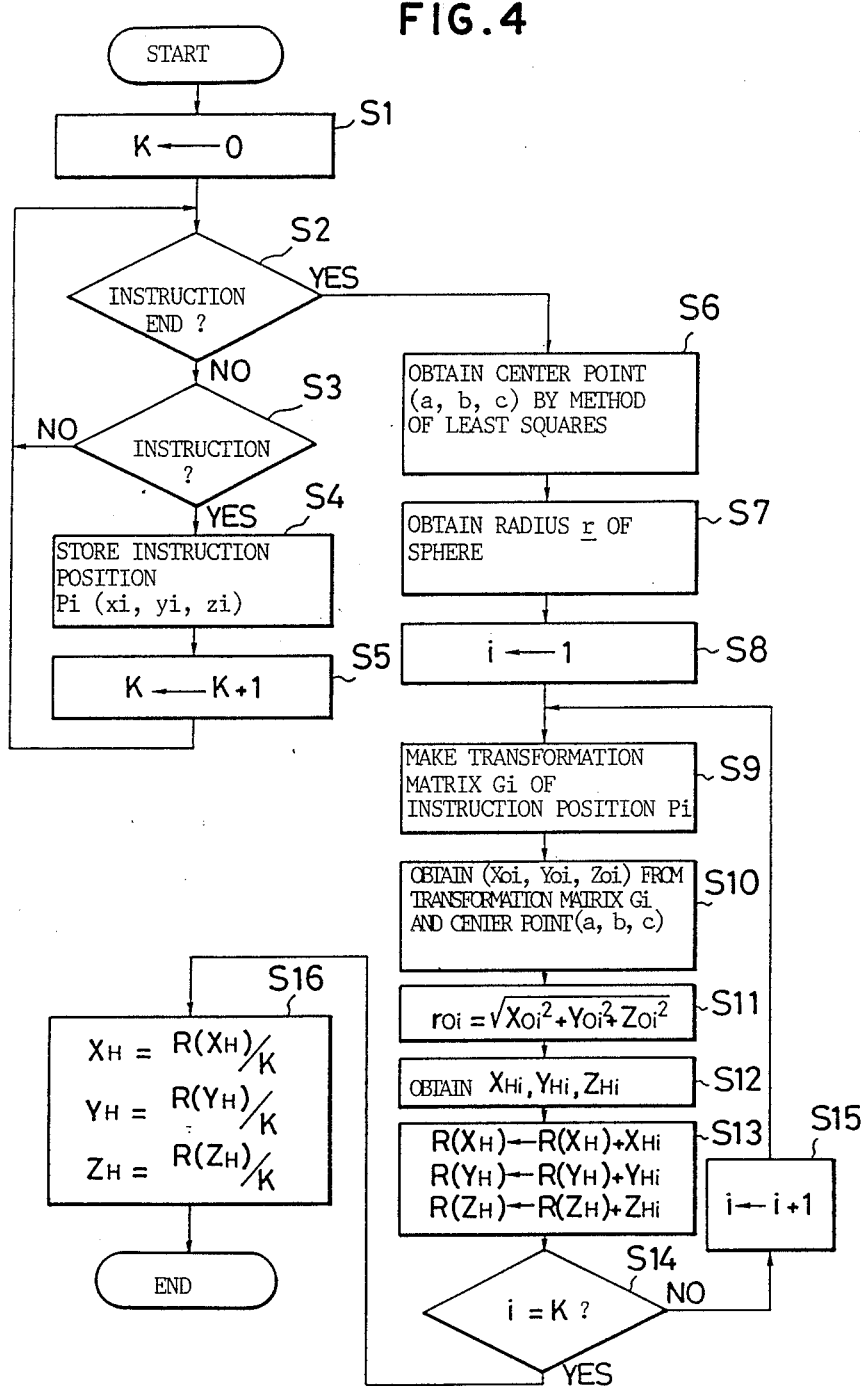
FIG. 4 is an operational flow chart of an embodiment of the invention.

Referring now to FIG. 4, the method according to the present invention will be described. If the CRT/MDI 55 is first operated to establish an automatic TCP setting mode (automatic tool tip point setting mode), the CPU in the control section 51 sets an index K to "0" (Step S1), and then determines whether input is received due to the operation of an instruction end key or an instruction key of the instruction operation panel 54 (Steps S2 and S3). If the operator depresses the instruction key after locating the tool tip at point 4 (see FIG. 1), the CPU causes the memory 53 to store the instruction position Pi (=P1), i.e., the coordinate position Pi (xi, yi, zi) of the center point of the faceplate, and the current tool posture vectors ($1_X$, $1_Y$, $1_Z$), ($m_X$, $m_Y$, $m_Z$), and ($n_X$, $n_Y$, $n_Z$) (Step S4). The subscript i indicates the order of instruction, and is given by i=K+1. After the index K is incremented by "1" (Step S5), the program returns to Step S2, and waits for the input of the next instruction command (Step S3). Thereafter, each time the operator inputs an instruction command after changing the posture of the robot 58 while the tool tip point remains located on the predetermined point 4, the CPU causes the memory to store the instruction position Pi (xi, yi, zi). These steps S2–S5 are repeated to instruct the robot of at least four points.

Theoretically, the tool tip point can be satisfactorily set by instructing the robot of the coordinate positions of the faceplate center point for the four postures, as mentioned before with reference to FIG. 1. In the present embodiment, however, four or more points are given for instruction so that the sphere is obtained in an approximate manner on the basis of these four or more instruction points, as mentioned later, assuming a case that the tool tip point cannot be accurately located on the predetermined point 4.

Figure 5:
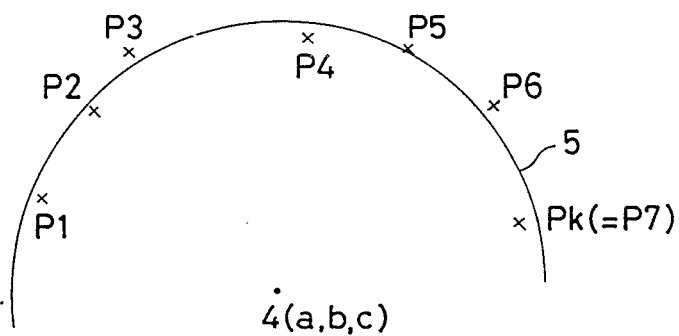
FIG. 5 is a diagram illustrating a method for approximating a sphere in accordance with various instruction points.

When the operator has given instruction for four or more points and then inputs an instruction end command, the program of FIG. 4 proceeds to Step S6, and the CPU approximates the sphere 5 as shown in FIG. 5, on the basis of the individual positions P1 (x1, y1, z1) to Pk (xk, yk, zk) given for instruction, and then obtains the center point (a, b, c) of the sphere 5. The index K, which is incremented by "1" in Step S5 with every instruction, indicates the number of instruction points.

In the present embodiment, the sphere 5 is approximated by means of K instruction points, P1 to Pk, and the method of least squares is used to obtain the center point (a, b, c) and the radius r of the sphere (Step S6).

More specifically, an equation representative of the sphere having the radius r and its center on the position (a, b, c) is given by $$(x-a)^2 + (y-a)^2 + (z-c)^2 = r^2. \quad (7)$$

If an error at each instruction position Pi (xi, yi, zi) (here i=1, 2, 3 ... k) and the square sum of the error are $\epsilon i$ and E, respectively, the following relations hold.

$$\epsilon i = (xi - a)^2 + (yi - b)^2 + (zi - c)^2 - r^2,$$

$$\begin{aligned}\epsilon i^2 &= \{(xi - a)^2 + (yi - b)^2 + (zi - c)^2 - r^2\}^2 \\ &= (xi - a)^4 + (yi - b)^4 + (zi - c)^4 + r^4 + \\ & \quad 2(xi - a)^2(yi - b)^2 + 2(yi - b)^2(zi - c)^2 + \\ & \quad 2(zi - c)^2(xi - a)^2 - 2r^2(xi - a)^2 - \\ & \quad 2r^2(yi - b)^2 - 2r^2(zi - c)^2,\end{aligned}$$

$$E = \sum_{i=1}^{k} \epsilon i^2,$$

$$\begin{aligned}\delta E/\delta r &= 4kr^3 - 4r\Sigma(xi - a)^2 - 4r\Sigma(yi - b)^2 - \\ & \quad 4r\Sigma(zi - c)^2 \\ &= 4r\{(kr^2 - \Sigma(xi - a)^2 - \Sigma(yi - b)^2 - \\ & \quad \Sigma(zi - c)^2\}.\end{aligned}$$

If $\delta E/\delta r \to 0$ is given, in order to obtain the value of r corresponding to the minimum value of the square sum E of the error, the following equation holds.

$$\begin{aligned}&r = 0 \text{ or} \\ &kr^2 - \Sigma(xi - a)^2 - \Sigma(yi - b)^2 - \Sigma(zi - c)^2 = 0. \\ &\text{However, } r \text{ is } r \neq 0, \text{ so that we obtain} \\ &r^2 = \{\Sigma(xi - a)^2 + \Sigma(yi - b)^2 + \Sigma(zi - c)^2\}/k.\end{aligned} \quad (8)$$

In order to obtain the point (a, b, c) corresponding to the minimum value of the square sum of the error, moreover, a condition such that the partial differential of the sum E for each of the variables a, b and c is infinitesimal is calculated. First, the partial differential of the sum E for the variable a is obtained as follows:

$$\begin{aligned}\delta E/\delta a &= -4\Sigma(xi - a)^3 - 4\Sigma(xi - a)(yi - b)^2 - \\ & \quad 4\Sigma(xi - a)(zi - c)^2 + 4r^2 \Sigma(xi - a).\end{aligned}$$

Here if $\delta E/\delta r \to 0$ is given, we obtain $$\Sigma(xi - a)^3 + \Sigma(xi - a)\{(yi - b)^2 + (zi - c)^2 - r^2\} = 0,$$

$$\Sigma xi^3 - 3\Sigma xi^2 a + 3\Sigma xia^2 - ka^3 + \Sigma \{(yi - b)^2 + (zi - c)^2 - r^2\}xi - a\Sigma\{(yi - b)^2 + (zi - c)^2 - r^2\} = 0.$$

From the equation (7), we obtain
$$\Sigma xi^3 - 3\Sigma xi^2 a + 3\Sigma xia^2 - ka^3 + \Sigma yi^2 xi - 2\Sigma yixib +$$
$$\Sigma xib^2 + \Sigma zi^2 xi - 2\Sigma zixic + \Sigma xic^2 - \Sigma r^2 xi - a\Sigma(xi - a)^2 = 0.$$

From the equation (8), we obtain
$$\Sigma xi^3 - 3\Sigma xi^2 a + 3\Sigma xia^2 - ka^3 + \Sigma yi^2 xi - 2\Sigma yixib +$$

-continued $$\Sigma xib^2 + \Sigma zi^2 xi - 2\Sigma zixic + \Sigma xic^2 - \Sigma_i xi^2 \Big( \Sigma_j (xj - a)^2 +$$

$$\Sigma_j (yj - b)^2 + \Sigma_j (zj - c)^2 \Big)/k + a\Sigma(xi - a)^2 = 0$$

(where j=1, 2 ... k).

Removing the parentheses of the above equation, we obtain $$\Sigma xi^3 - 3\Sigma xi^2 a + 3\Sigma xia^2 - ka^3 + \Sigma yi^2 xi - 2\Sigma yixib + \Sigma xib^2 +$$

$$\Sigma zi^2 xi - 2\Sigma zixic + \Sigma xic^2 - \Sigma xi\Sigma xj^2/k + 2a\Sigma xi\Sigma xj/k - a^2\Sigma xi -$$

$$\Sigma xi\Sigma yj^2/k + 2b\Sigma xi\Sigma yj/k - b^2\Sigma xi - \Sigma xi\Sigma zj^2/k +$$

$$2c\Sigma xi\Sigma zj/k - c^2\Sigma xi + a\Sigma xi^2 - 2a^2\Sigma xi + ka^3 = 0.$$

Rearranging the above equation, we obtain $$\begin{aligned}&\Sigma xi^3 - 2a\Sigma xi^2 + \Sigma xiyi^2 - 2b\Sigma xiyi + \Sigma xizi^2 - \\ &2c\Sigma xizi - \Sigma xi\Sigma xj^2/k - \Sigma xi\Sigma yj^2/k - \Sigma xi\Sigma zj^2/k + \\ &2a\Sigma xi\Sigma xj/k + 2b\Sigma xi\Sigma yj/k + 2c\Sigma xi\Sigma zj/k = 0.\end{aligned} \quad (9)$$

If the coefficients of the variables a, b and c of the equation (9) are A1, A2 and A3, respectively, and if the constant term is A4, we obtain $$A1 \cdot a + A2 \cdot b + A3 \cdot c + A4 = 0. \quad (10)$$

Here the coefficients A1 to A3 and the constant term A4 are given by $$\begin{aligned}A1 &= 2\Sigma xi\Sigma xj/k - 2\Sigma xi^2, \\ A2 &= 2\Sigma xi\Sigma yj/k - 2\Sigma xiyi, \\ A3 &= 2\Sigma xi\Sigma zj/k - 2\Sigma xizi, \\ A4 &= \Sigma xi^3 + \Sigma xjyi^2 + \Sigma xjzi^2 - \\ & \quad \Sigma xi(\Sigma xj^2 + \Sigma yj^2 + \Sigma zj^2)/k.\end{aligned}$$

Likewise, the square sum E of the error is subjected to a partial differentiation for the variable b ($\delta E/\delta b$). If $\delta E/\delta b = 0$ is given, the equation and coefficients B1, B2 and B3 of the variables a, b and c and a constant term B4 are given as follows:

$$B1 \cdot a + B2 \cdot b + B3 \cdot c + B4 = 0, \quad (11)$$

$$\begin{aligned}B1 &= 2\Sigma yi\Sigma xj/k - 2\Sigma xiyi, \\ B2 &= 2\Sigma yi\Sigma yj/k - 2\Sigma yi^2, \\ B3 &= 2\Sigma yi\Sigma zj/k - 2\Sigma yizi, \\ B4 &= \Sigma yizi^2 + \Sigma yi^3 + \Sigma yixi^2 - \\ & \quad \Sigma yi(\Sigma xj^2 + \Sigma yj^2 + \Sigma zj^2)/k.\end{aligned}$$

The square sum E of the error is subjected to a partial differentiation for the variable c. If $\delta E/\delta c = 0$ is given, the equation and coefficients C1, C2 and C3 of the variables a, b and c and a constant term C4 are given as follows:

$$C1 \cdot a + C2 \cdot b + C3 \cdot c + C4 = 0. \quad (12)$$

-continued $C1 = 2\Sigma z_i \Sigma x_j/k - 2\Sigma x_i z_i,$ $C2 = 2\Sigma z_i \Sigma x_j/k - 2\Sigma y_i z_i,$ $C3 = 2\Sigma z_i \Sigma z_j/k - 2\Sigma z_i^2,$ $C4 = \Sigma x_i^2 z_i + \Sigma y_i^2 z_i + \Sigma z_i^3 - \Sigma z_i(\Sigma x_j^2 + \Sigma y_j^2 + \Sigma z_j^2)/k.$ Here $\Sigma$ represents $$\sum_{i=1}^{k} \text{ or } \sum_{j=1}^{k}.$$

For example, $\Sigma x_i$ and $\Sigma x_j$ represent $$\sum_{i=1}^{k} x_i \text{ and } \sum_{j=1}^{k} x_j,$$

respectively.

Since the values $x_i$, $y_i$ and $z_i$ are obtained and stored in response to the instruction of Step S3, the coefficients and constant terms A1 to A4, B1 to B4, and C1 to C4 are obtained from these stored values. In consequence, the unknowns a, b, c can be obtained from the tenary linear simultaneous equations (10), (11) and (12) (Step S6).

Subsequently, the equation (8) is solved to obtain the radius r of the sphere 5 in accordance with the center point (a, b, c) obtained in Step S6 and the individual stored positions ($x_i$, $y_i$, $z_i$) (Step S7).

In other words, $$r = \sqrt{\{\Sigma(x_i - a)^2 + \Sigma(y_i - b)^2 + \Sigma(z_i - c)^2\}/k}$$

is solved to obtain the radius r.

Based on the center point (a, b, c) of the sphere and the radius r of the sphere thus obtained, the vector ($X_H$, $Y_H$, $Z_H$), that is, the coordinate position ($X_H$, $Y_H$, $Z_H$) of the tool tip point (center point of the sphere), in the faceplate coordinate system with its origin on the center point of the faceplate, is obtained. More specifically, the vector ($X_{Hi}$, $Y_{Hi}$, $Z_{Hi}$) is obtained for each instruction position Pi in the processes of the following Steps S8 to S16, and the obtained values are averaged to obtain the aforesaid vector ($X_H$, $Y_H$, $Z_H$).

First, the index i is set to "1" in Step S8, and a transformation matrix Gi at the instruction position Pi (=P1) is made on the basis of the posture vectors ($1_X$, $1_Y$, $1_Z$), ($m_X$, $m_Y$, $m_Z$), and ($n_X$, $n_Y$, $n_Z$) at the instruction position Pi and the center point ($o_X$, $o_Y$, $o_Z$) of the faceplate. Since the center point of the faceplate is at the instruction position, ($o_X$, $o_Y$, $o_Z$)=($x_i$, $y_i$, $z_i$) holds. Since the posture vector depends on the value of the joint angle(s) of the robot, moreover, the transformation matrix Gi is obtained as follows:

$$Gi = \begin{pmatrix} l_X l_Y l_Z & -(l_X O_X + l_Y O_Y + l_Z O_Z) \\ m_X m_Y m_Z & -(m_X O_X + m_Y O_Y + m_Z O_Z) \\ n_X n_Y n_Z & -(n_X O_X + n_Y O_Y + n_Z O_Z) \\ 0 \quad 0 \quad 0 & 1 \end{pmatrix}$$

Then, the calculation of the equation (6) is effected on the basis of the transformation matrix Gi thus obtained and the center point (a, b, c), and a vector ($X_{oi}$, $Y_{oi}$, $Z_{oi}$) directed from the center point 3 of the faceplate at the instruction position Pi to the center point (a, b, c) is obtained (Step S10). Based on the vector ($X_{oi}$, $Y_{oi}$, $Z_{oi}$) thus obtained, a radius $r_{oi}$ is obtained according to the following equation (Step S11).

$$r_{oi} = \sqrt{X_{oi}^2 + Y_{oi}^2 + Z_{oi}^2}.$$

Figure 6:
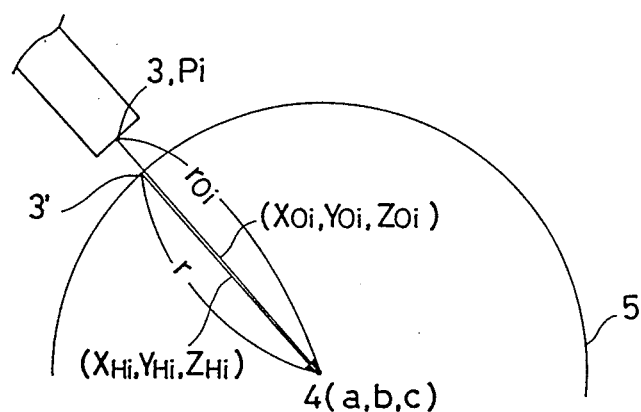
FIG. 6 is a diagram illustrating a method for obtaining the vector of the center point of the sphere in the faceplate coordinate system at each instruction point.

Thus, the vector ($X_{oi}$, $Y_{oi}$, $Z_{oi}$) and the size (radius) $r_{oi}$ are obtained in steps S10 and S11 as shown in FIG. 6. However, the vector ($X_{Hi}$, $Y_{Hi}$, $Z_{Hi}$) to be obtained is a vector (whose size is equal to the radius r) directed from a point 3' on the approximated sphere 5 to the point 4.

Hereupon, the following equation (13) holds between the vector ($X_{oi}$, $Y_{oi}$, $Z_{oi}$) and the vector ($X_{Hi}$, $Y_{Hi}$, $Z_{Hi}$).

$$r/r_{oi} = X_{Hi}/X_{oi} = Y_{Hi}/Y_{oi} = Z_{Hi}/Z_{oi}. \quad (13)$$

From the equation (13), we obtain $$X_{Hi} = X_{oi} \cdot r/r_{oi}, \quad (14)$$

$$Y_{Hi} = Y_{oi} \cdot r/r_{oi}, \quad (15)$$

$$Z_{Hi} = Z_{oi} \cdot r/r_{oi}. \quad (16)$$

The equations (14) to (16) are calculated in accordance with ($X_{oi}$, $Y_{oi}$, $Z_{oi}$) obtained in Step S10 and $r_{oi}$ obtained in Step S11, to obtain the vector ($X_{Hi}$, $Y_{Hi}$, $Z_{Hi}$) (Step S12). Then, the vector values $X_H$, $Y_H$ and $Z_H$ obtained in Step S12 are added to the values of registers R($X_H$), R($Y_H$) and R($Z_H$), respectively, and stored (Step S13). The registers R($X_H$) to R($Z_H$) are previously initialized and reset to "0" when the automatic tool tip point setting mode is established.

Subsequently, whether the index i is equal to the value of the index K, which is indicative of a predetermined frequency of instruction, is determined (Step S14). If the two values are not equal, the index i is incremented by "1" (Step S15), and the processes of Step S9 and the subsequent steps are repeated. As a result, a vector directed from the faceplate center point 3 at each instruction position to the center point (a, b, c) of the sphere 5, that is, the coordinate position of the tool tip point in the faceplate coordinate system, is added to each of the registers R($X_H$), R($Y_H$) and R($Z_H$). When the index i attains the instruction frequency K, the respective values of the registers R($X_H$), R($Y_H$) and R($Z_H$) are divided by the instruction frequency K. Thus, the aforesaid averaged vector ($X_H$, $Y_H$, $Z_H$), that is, the coordinate position of the tool tip point in the faceplate coordinate system, is obtained (Step S16).

If the value ($X_H$, $Y_H$, $Z_H$) is stored as the tool tip coordinate position in the memory 53, then the tool tip point is automatically set.

In the embodiment described above, the vectors ($X_{Hi}$, $Y_{Hi}$, $Z_{Hi}$) at the individual instruction points are obtained, and the vector ($X_H$, $Y_H$, $Z_H$) is determined by the average of these values. If the required accuracy is not very high, however, the vector, that is, the tool tip point in the coordinate system with its origin on the center point of the faceplate, may be obtained by effecting the calculation of the equation (6) on the basis of the center point (a, b, c) of the sphere obtained in Step S6 and the coordinate position of any one of the instruction points.

What is claimed is:

1. A method for automatically setting a tip point of a tool, comprising the steps of:
   (a) causing a robot, having an aim with a faceplate containing a center, to assume at least four postures while maintaining the tip point of the tool on a fixed point within a space occupied by said robot and instructing said robot of coordinate positions of the center point of the faceplate of said robot, using a base coordinate system set in the space occupied by said robot, corresponding to the at least four postures;
   (b) calculating coordinates of a center of curvature of a spherical surface passing approximately through the coordinate positions instructed in step (a) for the center point of the faceplate in dependence upon the coordinate positions; and
   (c) determining and setting a coordinate position of the tip point, in a faceplate coordinate system for the faceplate, in dependence upon posture vectors of the tool, the coordinates of the center of curvature of the spherical surface calculated in step (b), and at least one of the coordinate positions of the center point of the faceplate given for instruction in step (a).

2. A method for automatically setting a tip point of a tool according to claim 1, wherein said determining in step (c) comprises the steps of:
   (c1) determining the coordinate position of the tip point corresponding to each of the postures of said robot by using the individual coordinate positions of the center point of the faceplate given for instruction in step (a); and
   (c2) averaging the coordinate positions of the tip point determined for the at least four postures.

3. A method for automatically setting a tip point of a tool according to claim 1, wherein said spherical surface is determined in step (b) so that the spherical surface passes immediately near the coordinate positions given for instruction in step (a).

4. A method for automatically setting a tip point of a tool according to claim 3, wherein said spherical surface is determined by using a method of least squares.

5. A method for obtaining position information of a tool tip relative to a faceplate of a robot arm, comprising the steps of:
   (a) positioning the robot arm in at least four different postures while maintaining the tool tip at a fixed point;
   (b) detecting origin point coordinates of the faceplate in a robot coordinate system in each of the at least four different postures;
   (c) defining a spherical surface, having a radius and a center of curvature with coordinates in the robot coordinate system, such that the origin point coordinates of the faceplate detected in step (b) lie approximately on the spherical surface; and
   (d) determining a coordinate position of the tool tip in a faceplate coordinate system in dependence upon the radius and the coordinates of the center of curvature of the spherical surface defined in step (c) and the origin point coordinates of the faceplate corresponding to at least one of the at least four different postures.

6. A method according to claim 5, wherein said defining in step (c) comprises the steps of:
   (c1) calculating the coordinates in the robot coordinate system for the center of curvature of the spherical surface using least squares approximation and the origin point coordinates of the faceplate in the at least four different postures; and
   (c2) calculating the radius using the coordinates of the center of curvature of the spherical surface and the origin point coordinates of the faceplate for at least one of the at least four different postures.

7. A method according to claim 5, wherein said determining in step (d) comprises the steps of:
   (d1) generating a transformation matrix for at least one of the at least four different postures in dependence upon posture vectors defining the at least one of the at least four different postures of the robot arm in the robot coordinate system;
   (d2) transforming the coordinates in the robot coordinate system of the center of curvature of the spherical surface into coordinates in the faceplate coordinate system.

8. A method according to claim 7, wherein step (d) further comprises the steps of:
   (d3) scaling the coordinates in the faceplate coordinate system of the center of curvature of the spherical surface by the radius of the spherical surface defined in step (c) and a distance from the center of curvature to the faceplate obtained using the coordinates calculated in step (d2), to produce a scaled vector;
   (d4) repeating steps (d1)–(d3) for each posture in a set of the at least four postures to produce a plurality of scaled vectors; and
   (d5) averaging the scaled vectors to obtain the position information of the tool tip relative to the faceplate of the robot arm.

* * * * *

UNITED STATES PATENT AND TRADEMARK OFFICE
CERTIFICATE OF CORRECTION

PATENT NO. : 4,979,127

DATED : December 18, 1990

INVENTOR(S) : Mizuno et al.

It is certified that error appears in the above-identified patent and that said Letters Patent is hereby corrected as shown below:

Col. 2,    line 31, after "faceplate" insert --center point--.

Col. 3,    line 1, change "FIG. 3" to --FIG. 2--;
           line 6, change "vector" to --vectors 8 and 7--;
           line 7, delete " 8 and 7".

Col. 9,    line 6, change "aim" to --arm--.

Signed and Sealed this

Sixth Day of April, 1993

Attest:

STEPHEN G. KUNIN

Attesting Officer        Acting Commissioner of Patents and Trademarks